(12) United States Patent
Ma et al.

(10) Patent No.: US 11,024,060 B1
(45) Date of Patent: Jun. 1, 2021

(54) GENERATING NEUTRAL-POSE TRANSFORMATIONS OF SELF-PORTRAIT IMAGES

(71) Applicant: Adobe Inc., San Jose, CA (US)

(72) Inventors: Liqian Ma, Leuven (BE); Jingwan Lu, Santa Clara, CA (US); Zhe Lin, Fremont, CA (US); Connelly Barnes, Seattle, WA (US); Alexei A. Efros, Berkeley, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/812,669

(22) Filed: Mar. 9, 2020

(51) Int. Cl.
| | |
|---|---|
| *G09G 5/00* | (2006.01) |
| *G06T 11/00* | (2006.01) |
| *G06K 9/00* | (2006.01) |
| *G06T 11/60* | (2006.01) |
| *G06T 11/40* | (2006.01) |
| *G06K 9/62* | (2006.01) |

(52) U.S. Cl.
CPC ........ *G06T 11/001* (2013.01); *G06K 9/00362* (2013.01); *G06K 9/00671* (2013.01); *G06K 9/6256* (2013.01); *G06T 11/40* (2013.01); *G06T 11/60* (2013.01)

(58) Field of Classification Search
CPC ......... G06T 11/001; G06T 11/40; G06T 11/60
See application file for complete search history.

(56) References Cited

U.S. PATENT DOCUMENTS

| | | | | |
|---|---|---|---|---|
| 7,154,510 | B2* | 12/2006 | Simon ............... | G06T 11/60 345/619 |
| 9,247,129 | B1* | 1/2016 | Gray ................. | G06T 5/30 |
| 2019/0082118 | A1* | 3/2019 | Wang ................ | H04N 5/23229 |

OTHER PUBLICATIONS

Grigorev, A et al., "Coordinate-based Texture Inpainting for Pose-Guided Image Generation", arXiv:1811.11459v1, Nov. 28, 2018, 11 pages.
Guler, RA, et al., "DensePose: Dense Human Pose Estimation in the Wild", arXiv:1802.00434v1, Feb. 1, 2018, 12 pages.
Siarohin, A. et al., "Deformable GANs for Pose-based Human Image Generation", arXiv:1801.00055v2, Apr. 6, 2018, 20 pages.
Arjovsky, M. et al., "Wasserstein GAN", arXiv:1701.07875v3, Dec. 6, 2017, 32 pages.

(Continued)

*Primary Examiner* — Charles Tseng
(74) *Attorney, Agent, or Firm* — Finch & Maloney PLLC

(57) ABSTRACT

Techniques are provided for converting a self-portrait image into a neutral-pose portrait image, including receiving a self-portrait input image, which contains at least one person who is the subject of the self-portrait. A nearest pose search selects a target neutral-pose image that closely matches or approximates the pose of the upper torso region of the subject in the self-portrait input image. Coordinate-based inpainting maps pixels from the upper torso region in the self-portrait input image to corresponding regions in the selected target neutral-pose image to produce a coarse result image. A neutral-pose composition refines the coarse result image by synthesizing details in the body region of the subject (which in some cases includes the subject's head, arms, and torso), and inpainting pixels into missing portions of the background. The refined image is composited with the original self-portrait input image to produce a neutral-pose result image.

20 Claims, 9 Drawing Sheets

(56) References Cited

OTHER PUBLICATIONS

Balakrishnan, G. et al., "Synthesizing Images of Humans in Unseen Poses", CVPR, Computer Vision Foundation, 2018, 9 pages.
Binkowski, M. et al., "Demystifying MMD GANs", arXiv:1801.01401v4, Mar. 21, 2018, 36 pages.
Brock, A. et al., "Large Scale GAN Training for High Fidelity Natural Image Synthesis", arXiv:1809.11096v2, Feb. 25, 2019, 35 pages.
Cao, Z. et al., "OpenPose: Realtime Multi-Person 2D Pose Estimation using Part Affinity Fields", arXiv:1812.08008v2, May 30, 2019, 14 pages.
Choi, Y. et al., "StarGAN: Unified Generative Adversarial Networks for Multi-Domain Image-to-Image Translation", CRVP, Computer Vision Foundation, 2018, 9 pages.
Darabi, S. et al., "Image Melding: Combining Inconsistent Images using Patch-based Synthesis", SIGGRAPH 2012 ACM Transactions on Graphics, Jul. 2012, 10 pages.
Dong, H. et al., "Soft-GatedWarping-GAN for Pose-Guided Person Image Synthesis", 32nd Conference on Neural Information Processing Systems (NeurIPS 2018), Montréal, Canada, 11 pages.
Esser, P. et al., "A Variational U-Net for Conditional Appearance and Shape Generation", CVPR, Computer Vision Foundation, 2018, 10 pages.
Gafni, O. et al., "Vid2Game: Controllable Characters Extracted from Real-World Videos", arXiv:1904.08379v1, Apr. 17, 2019, 14 pages.
Ge, Y. et al., "DeepFashion2: A Versatile Benchmark for Detection, Pose Estimation, Segmentation and Re-Identification of Clothing Images", CVPR, Computer Vision Foundation, 2019, 9 pages.
Goodfellow, I. et al., "Generative Adversarial Nets", arXiv:1406.2661v1, Jun. 10, 2014, 9 pages.
He, K. et al., "Mask R-CNN", arXiv:1703.06870v3, Jan. 24, 2018, 12 pages.
Lee, H.Y. et al., "Diverse Image-to-Image Translation via Disentangled Representations", ECCV 2018, Computer Vision Foundation, 2018, 17 pages.
Huang, J.B. et al., "Image Completion using Planar Structure Guidance", AMC Transactions on Graphics, Jul. 2014, 10 pages.
Karras, T. et al., "A Style-Based Generator Architecture for Generative Adversarial Networks", CVPR, Computer Vision Foundation, 2019, 10 pages.
Kingma, D. and M. Welling, "Auto-Encoding Variational Bayes", arXiv:1312.6114v10, May 1, 2014, 14 pages.
Lassner, C. et al., "A Generative Model of People in Clothing", ICCV, Computer Vision Foundation, 2017, 10 pages.
Liang, X. et al., "Deep Human Parsing with Active Template Regression", arXiv:1503.02391v1, Mar. 9, 2015, 14 pages.
Lin, T.Y. et al., "Microsoft COCO: Common Objects in Context", arXiv:1405.0312v3, Feb. 21, 2015, 15 pages.
Liu, M.Y. et al., "Unsupervised Image-to-Image Translation Networks", arXiv:1703.00848v6, Jul. 23, 2018, 11 pages.
Liu, Z. et al., "DeepFashion: Powering Robust Clothes Recognition and Retrieval with Rich Annotations", CVPR, Computer Vision Foudation, 2016, 9 pages.
Ma, L. et al., "Exemplar Guided Unsupervised Image-To-Image Translation With Semantic Consistency", arXiv:1805.11145v4, Mar. 13, 2019, 10 pages.
Ma, L. et al., "Disentangled Person Image Generation", CVPR, Computer Vision Foundation, 2018, 10 pages.
Ma, L. et al., "Pose Guided Person Image Generation", arXiv:1705.09368v6, Jan. 28, 2018, 11 pages.
Makhzani, A. et al., "Adversarial Autoencoders", arXiv:1511.05644v2, May 25, 2016, 16 pages.
Mao, X. et al., "Least Squares Generative Adversarial Networks", ICCV, Computer Vision Foundation, 2017, 9 pages.
Mejjati, Y. et al., "Unsupervised Attention-guided Image-to-Image Translation", arXiv:1806.02311v3, Nov. 8, 2018, 22 pages.
Mirza, Mehdi, "Conditional Generative Adversarial Nets", arXiv:1411.1784v1, Nov. 6, 2014, 7 pages.
Moeslund, T. et al., "A survey of advances in vision-based human motion capture and analysis", ScienceDirect, Computer Vision and Image Understanding, 2006, 38 pages.
Neverova, N. et al., "Dense Pose Transfer", ECCV 2018, Computer Vision Foundation, 2018, 16 pages.
Nazeri, K. et al., "EdgeConnect: Generative Image Inpainting with Adversarial Edge Learning", arXiv:1901.00212v3, Jan. 11, 2019, 17 pages.
Barnes, C. et al., "PatchMatch: A Randomized Correspondence Algorithm for Structural Image Editing", ACM Transactions on Graphics, Aug. 2009, 11 pages.
Pathak, D. et al., "Context Encoders: Feature Learning by Inpainting", CVPR, Computer Vision Foundation, 2016, 9 pages.
Pumarola, A. et al., "Unsupervised Person Image Synthesis in Arbitrary Poses", CVPR, Computer Vision Foundation, 2018, 9 pages.
Qi, X. et al., "Semi-parametric Image Synthesis", CVPR, Computer Vision Foundation, 2018, 9 pages.
Qian, S. et al., "Make a Face: Towards Arbitrary High Fidelity Face Manipulation", ICCV, Computer Vision Foundation, 2019, 10 pages.
Radford, A. and L. Metz, "Unsupervised Representation Learning With Deep Convolutional Generative Adversarial Networks", arXiv:1511.06434v2, Jan. 7, 2016, 16 pages.
Raj, A. et al,. "SwapNet: Image Based Garment Transfer", ECCV 2018, Computer Vision Foundation, 2018, 17 pages.
Reed, S. et al., "Learning What and Where to Draw", downloaded from http://www.scottreed.info/files/nips2016.pdf, 2016, 9 pages.
Reed, S. et al., "Generative Adversarial Text to Image Synthesis", Proceedings of the 33 rd International Conference on Machine Learning, New York, NY, USA, 2016, 10 pages.
Song, S. et al., "Unsupervised Person Image Generation with Semantic Parsing Transformation", CVPR, Computer Vision Foundation, 2019, 10 pages.
Van Den Oord, A. et al., "Pixel Recurrent Neural Networks", arXiv:1601.06759v3, Aug. 19, 2016, 11 pages.
Wu, W. et al., "TransGaGa: Geometry-Aware Unsupervised Image-to-Image Translation", CVPR, Computer Vision Foundation, 2019, 10 pages.
Xu, Z. and J. Sun, "Image Inpainting by Patch Propagation Using Patch Sparsity", IEEE Transactions on Image Processing, vol. 19, No. 5, May 2010, 13 pages.
Xu, N. et al., "Deep Image Matting", CVPR, Computer Vision Foundation, 2017, 10 pages.
Xun, H. et al., "Multimodal Unsupervised Image-to-Image Translation", ECCV 2018, Computer Vision Foundation, 2018, 18 pages.
Yu, Y. et al., "Free-Form Image Inpainting with Gated Convolution", ICCV, Computer Vision Foundation, 2019, 10 pages.
Yu, J. et al., "Generative Image Inpainting with Contextual Attention", CVPR, Computer Vision Foundation, 2018, 10 pages.
Wu, Y. and K. He, "Group Normalization", ECCV 2018, Computer Vision Foundation, 2018, 17 pages.
Zhang, H. et al., "StackGAN: Text to Photo-realistic Image Synthesis with Stacked Generative Adversarial Networks", ICCV, Computer Vision Foundation, 2017, 9 pages.
Zhang, R. et al., "The Unreasonable Effectiveness of Deep Features as a Perceptual Metric", CVPR, Computer Vision Foundation, 2018, 10 pages.
Yan, Z. et al., "Shift-Net: Image Inpainting via Deep Feature Rearrangement", ECCV 2018, Computer Vision Foundation, 2018, 17 pages.
Zhu, Z. et al., "Progressive Pose Attention Transfer for Person Image Generation", CVPR, Computer Vision Foundation, 2019, 10 pages.
Zhu, J.Y. et al., "Unpaired Image-to-Image Translation using Cycle-Consistent Adversarial Networks", ICCV, Computer Vision Foundation, 2017, 10 pages.

* cited by examiner

Input Image – Self-portrait

Arms extended toward camera and limited background

Result Image – Neutral pose

Neutral pose and inpainted background

Input Image – Self-portrait

Arms extended toward camera and limited background

Result Image – Neutral pose

Neutral pose and inpainted background

GENERATING NEUTRAL-POSE TRANSFORMATIONS OF SELF-PORTRAIT IMAGES

FIELD OF THE DISCLOSURE

This disclosure relates to the field of digital image processing, and more particularly, to techniques for generating neutral-pose transformations of self-portrait images.

BACKGROUND

Due to the ubiquity of smartphones, it has become popular to take self-portrait photographs, or "selfies," using the integrated camera of the smartphone. Such photographs are convenient to take because they do not require specialized equipment or photographic skills, as it is simply a matter of pointing and shooting using built-in software to automatically control image acquisition. The smartphone includes hardware and software that can automatically adjust exposure and focus, among other settings. Notably, selfies can be easily taken without the assistance of another photographer by simply holding the smartphone at arm's length (outstretched arm or arms) and aiming the camera toward the user. However, the result of holding the smartphone in such a manner is that often the user's arm or arms extend toward the camera lens, which produces an unnatural body pose in the image and can obscure the view of the background. In some cases, it is desirable for the subject to have a neutral pose; that is, a body pose that is more natural looking in the context of a portrait, such as portrait of the subject taken by another photographer. For example, it is more natural for the arms of a subject in a portrait to extend down adjacent to the subject's upper torso rather than away from the body toward the camera lens. However, obtaining such a neutral-pose portrait typically requires either another photographer to hold and operate the camera, or for the user to place the camera on a tripod or other stable surface and set a delay timer on the smartphone to take the image after the user has had a chance to pose for the camera. Nevertheless, these techniques are not as quick and easy as simply holding the camera at arm's length, which is the most common way of taking a self-portrait. Therefore, there are currently limited solutions for acquiring self-portrait photographs of subjects in neutral poses.

DETAILED DESCRIPTION

Techniques are provided for converting a self-portrait image into a neutral-pose portrait image. In an embodiment, the techniques are implemented as image conversion system configured to receive a self-portrait input image, which contains at least one person who is the subject of the self-portrait. The system includes a nearest pose search module, a coordinate-based inpainting module, and a neutral-pose composition module. The nearest pose search module is programmed or otherwise configured to select a target neutral-pose image that closely matches or approximates the pose of the upper torso region of the subject in the self-portrait input image. The coordinate-based inpainting module is programmed or otherwise configured to map pixels from the upper torso region in the self-portrait input image to corresponding regions in the selected target neutral-pose image to produce a coarse result image. The neutral-pose composition module is programmed or otherwise configured to refine the coarse result image by synthesizing details in the body region of the subject (which in some cases includes the subject's head, arms, and torso), and inpainting pixels into missing portions of the background. The refined image is composited with the original self-portrait input image to produce a neutral-pose result image.

General Overview

Figure 1A:
FIGS. 1A and 2A show two examples of self-portrait input images, where the subject has outstretched arms.
Figure 2A:
Figure 2A:

As noted above, cameras integrated into smartphones and other mobile devices have democratized photography by allowing casual users to take high-quality photos, including self-portraits, or selfies. However, there remains a tension between the ease of capturing images using these devices and the quality of the results. This is particularly apparent in the case of self-portraits. For example, a self-portrait can be quickly and easily taken by holding the smartphone with one or both outstretched arms. An outstretched arm pose causes several compositional problems in the portrait including an unnatural body pose and a partially blocked view of the background. For instance, FIGS. 1A and 2A show two examples of input images where the self-portrait includes the subject's arms extended toward the camera, which is an unnatural pose for a portrait. Furthermore, the subject's extended arms obstruct portions of the background. Therefore, it is desirable to transform or convert a self-portrait of the subject in an outstretched arm pose into a photograph where one or both of the subject's arms are positioned in a neutral or relaxed pose. For example, in an image that has one person as a subject, a neutral pose can include a pose where one or both of the subject's arms are positioned at rest alongside the subject's upper torso or in any position other than outstretched toward the camera, from the viewer's perspective.

Figure 1B:
FIGS. 1B and 2B show two examples of neutral-pose result images, in accordance with an embodiment of the present disclosure.
Figure 2B:
Figure 2B:

FIGS. 1B and 2B show, in accordance with an embodiment of the present disclosure, two examples of result images where the self-portrait input images of FIGS. 1A and 2A have been transformed, using techniques variously described in this disclosure, such that the subject's arms are in a neutral pose and the background has been inpainted around the subject's body, as compared to the corresponding original input images. Such transformations or conversions present non-trivial problems, including digitally synthesizing the subject's relaxed arms and the background portions that are obstructed by the outstretched arms in the original input image. To this end, techniques are disclosed for a process that digitally converts a self-portrait image of a subject with one or more outstretched arms into a neutral-pose portrait image (with non-outstretched arms).

As will be appreciated, the person in the image holding the camera may be doing so with one arm extended or both arms extended of one person, and the techniques provided herein can be used in any such cases. Numerous variations and embodiments will be appreciated in light of this disclosure.

Process Flow and System Architecture

Figure 3:
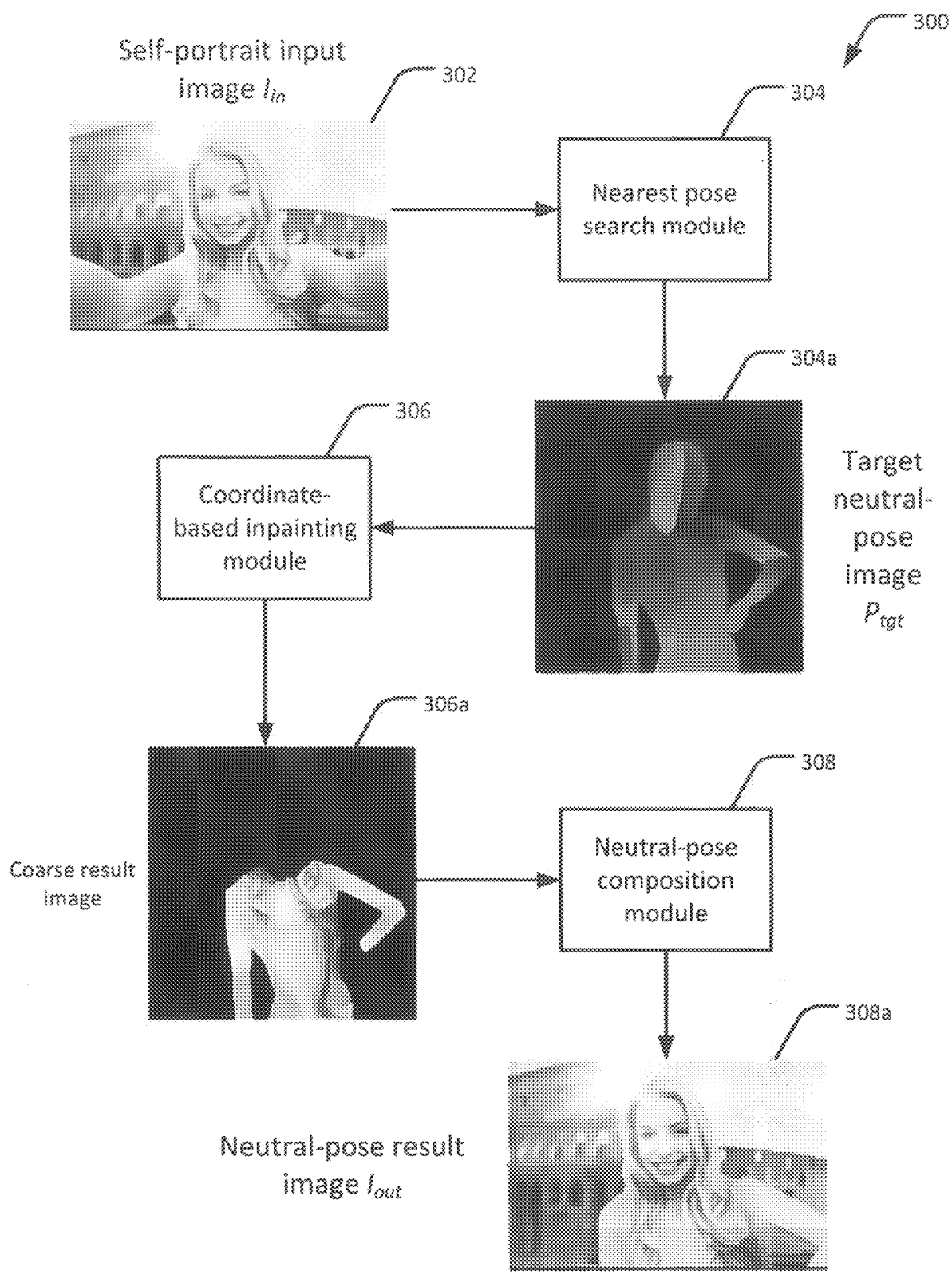
FIG. 3 is a flow diagram of an example image conversion process that converts a self-portrait image into a neutral-pose portrait image, in accordance with an embodiment of the present disclosure.

FIG. 3 is a flow diagram of an example image conversion process 300, in accordance with an embodiment of the present disclosure. The process 300 receives a self-portrait input image 302, which contains at least one person who is the subject of the self-portrait. As noted above, the self-portrait input image 302 can contain compositional problems, such as outstretched arms and an obstructed background. To correct such compositional problems, a nearest pose search module 304 is configured to select, from a dataset of various neutral-pose images, a target neutral-pose image 304a that closely matches or approximates the pose of the upper torso region of the subject in the self-portrait input image 302. An upper torso region of the subject, as used in this disclosure, includes a portion of the subject's upper body not including the arms. For example, the target neutral-pose image 304a can contain a subject having a similar pose in the upper torso region, excepting the arms, as the subject in the self-portrait input image 302 (e.g., erect, leaning, twisting, angled, front-facing, side-facing, etc.). Note that the subject in the target neutral-pose image 304a is not necessarily the same subject in the self-portrait input image 302, but both subjects have similar upper torso poses in the respective images 302 and 304a. A coordinate-based inpainting module 306 is configured to map pixels from the upper torso region in the self-portrait input image 302 to corresponding regions in the selected target neutral-pose image 304a to produce a coarse result image 306a. For example, the coarse result image 306a can contain pixels from the upper torso region of the self-portrait input image 302 painted into the upper torso region of the subject in the target neutral-pose image 304a, absent the subject's head and background. A neutral-pose composition module 308 is configured to refine the coarse result image 306a by synthesizing details in the body region of the subject, including the subject's arms, and torso, and inpainting pixels into missing portions of the background. The composition module 308 predicts an alpha map to fuse the synthesized region and the unedited region of the input selfie 302, including background and head. The refined image is composited with the original self-portrait input image 302 to produce a neutral-pose result image 308a.

In some embodiments, the target neutral-pose image 304a is an image of the subject of the self-portrait in a neutral pose. For example, two images of the same subject—one with outstretched arms (self-portrait pose) and an alternate without outstretched arms (neutral pose)—can be paired such that the target neutral-pose image 304a described above is the image of the subject of the self-portrait input image 302 in the alternate neutral pose. However, such image pairs are not always readily available. Thus, in some other embodiments, when there are no available portraits of the same subject in a self-portrait pose and a neutral pose, the target neutral-pose image 304a can instead be obtained from collections of various unpaired (unrelated) self-portrait images and neutral-pose images, such as those commonly available online or in public image repositories. The unpaired dataset of self-portrait and neutral-pose photographs is used to synthesize paired training data (self-portrait images paired with neutral-pose images) for self-supervised learning, such as described in further detail below.

Figure 4:
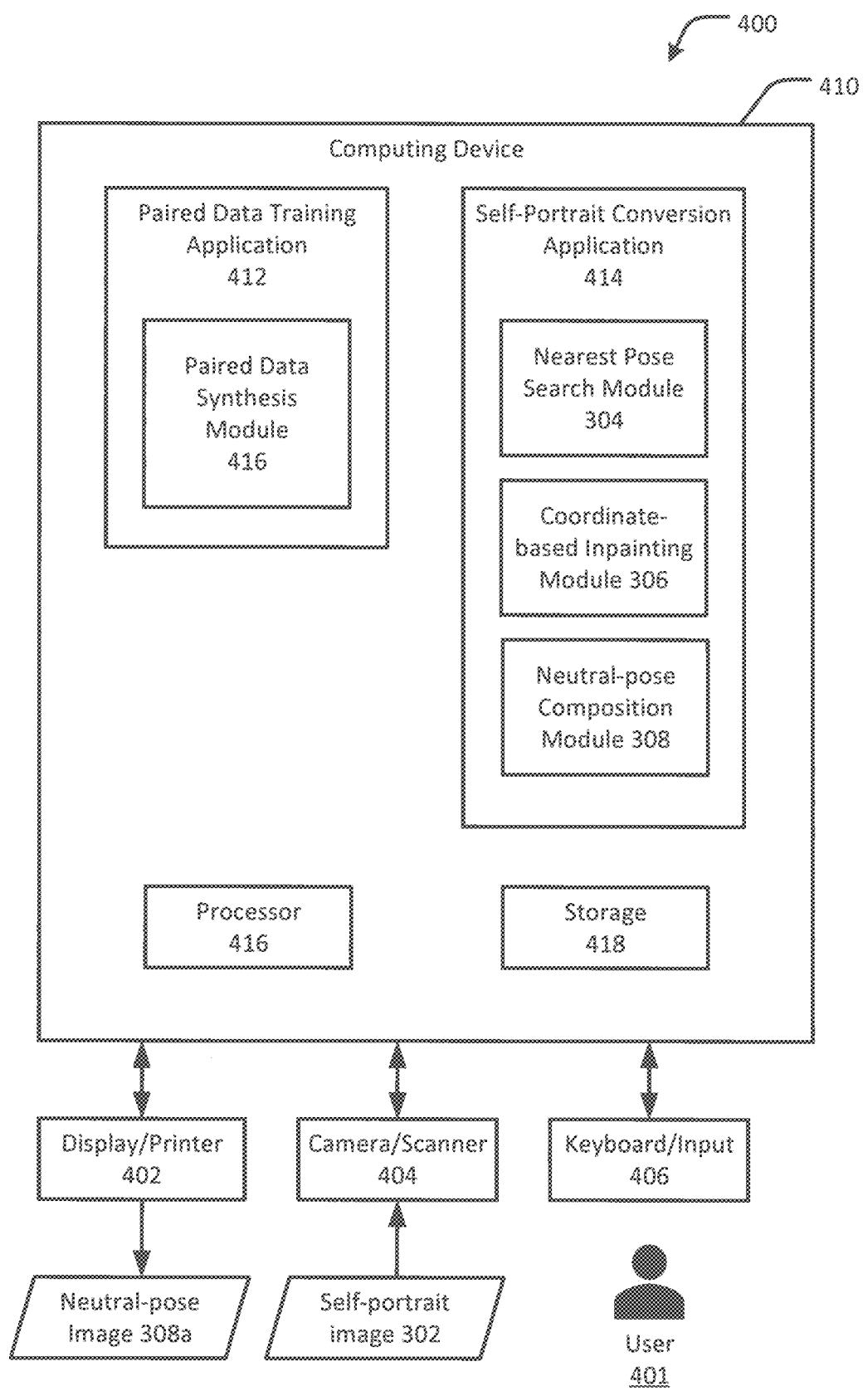
FIG. 4 is a block diagram of an example processor-based system programmed or otherwise configured to convert a self-portrait image into a neutral-pose portrait image, in accordance with an embodiment of the present disclosure.

FIG. 4 is a block diagram of an example processor-based system 400 programmed or otherwise configured to convert a self-portrait image into a neutral-pose portrait image, in accordance with an embodiment of the present disclosure. The system 400 includes a computing device 410, a display or printer device 402, a camera or scanner device 404, and a keyboard or other input device 406 for inputting text or other commands. The computing device 400 includes a paired data training application 412 that is configured to generate one or more datasets of paired self-portrait images and neutral-pose images. The computing device 400 further includes a self-portrait conversion application 414 that is configured to convert a self-portrait image into a neutral-pose portrait image. The paired data training application 412 includes software and or/other components of the computing device 410 that synthesize the paired data for self-supervised learning via a paired data synthesis module 416.

The self-portrait conversion application 414 represents a component of the computing device 410 that, in some example embodiments, allows a user 401 to convert a self-portrait image into a neutral-pose portrait image. More particularly, as disclosed herein, the self-portrait input image can contain compositional problems, such as outstretched arms and an obstructed background. To correct such compositional problems, the nearest pose search module 304 is configured to select a target neutral-pose image that closely matches or approximates the pose of the upper torso region of the subject in the self-portrait input image. The coordinate-based inpainting module 306 is configured to map pixels from the upper torso region in the self-portrait input image to corresponding regions in the selected target neutral-pose image to produce a coarse result image. The neutral-pose composition module 308 is configured to refine the coarse result image by synthesizing details in the body region of the subject and inpainting pixels into missing portions of the background, which is then composited with the original self-portrait input image to produce a neutral-pose result image.

In some embodiments, the computing device 410 includes a data storage unit 418 for use in storing retrievable information, such image data for use with, or produced by, the paired data training application 412 and/or the self-portrait conversion application 414. For example, the user 401 can use the data storage unit 418 to store self-portrait images 302 taken, for example, using the camera 404. The user 401 can then use the paired data training application 412, the self-portrait conversion application 414, or both, for example, for converting the self-portrait input image 302 into the neutral-pose result image 308a and causing the neutral-pose result image 308a to be displayed via a display or printed by a printer device 402, saved to a memory (for example, storage 418), or added to a digital document. The example data storage unit 418 can include one or more tangible computer-readable media. The media can be either included in the computing device 410 or operatively coupled to the computing device 410. The data storage unit 418 can include on-board flash memory and/or one or more removable memory cards or removable flash memory.

The computing device 410 can be used to perform any of the techniques as variously described in this disclosure. For example, the system 400 of FIG. 4, or any portions thereof, and the processes of FIGS. 3 and 9, or any portions thereof, may be implemented in the system 400. The computing device 410 can include any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system may be provided including a plurality of such computing devices.

The data storage unit 418 can include one or more storage devices or non-transitory computer-readable media having encoded thereon one or more computer-executable instructions or software for implementing techniques as variously described in this disclosure. The storage devices may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage devices may include other types of memory as well, or combinations thereof. The storage devices may be provided on the system 400 or provided separately or remotely from the system 400. The non-transitory computer-readable media may include, but are not limited to, one or more types of hardware memory, non-transitory tangible media (for example, one or more magnetic storage disks, one or more optical disks, one or more USB flash drives), and the like. The non-transitory computer-readable media included in the system 400 may store computer-readable and computer-executable instructions or software for implementing various embodiments.

The system 400 also includes at least one processor 416 for executing computer-readable and computer-executable instructions or software stored in data storage unit 418 or other non-transitory computer-readable media, and other programs for controlling system hardware. Virtualization may be employed in the system 400 so that infrastructure and resources in the system 400 may be shared dynamically. For example, a virtual machine may be provided to handle a process running on multiple processors so that the process appears to be using only one computing resource rather than multiple computing resources. Multiple virtual machines may also be used with one processor.

The user 401 may interact with the system through the display or printer device 402, such as a screen, monitor, display, or printer, which may display one or more user interfaces. The display or printer device 402 may also display other aspects, elements or information or data associated with some embodiments. The system 400 may include other I/O devices 406 for receiving input from a user, for example, a keyboard, a joystick, a game controller, a pointing device (e.g., a mouse, a user's finger interfacing directly with a touch-sensitive display device, etc.), or any suitable user interface. The system 400 may include other suitable conventional I/O peripherals. The system 400 includes or is operatively coupled to various suitable devices for performing one or more of the aspects as variously described in this disclosure.

The computing device 410 can run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on computing device 410 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having several input/output ports for receiving and outputting data, and several embedded routines for carrying out the functionality described in this disclosure. In a more general sense, any suitable combination of hardware, software, and firmware can be used, as will be apparent.

As will be appreciated in light of this disclosure, the various modules and components of the system, such as the paired data training application 412, the self-portrait conversion application 414, or any combination of these, is implemented in software, such as a set of instructions (e.g., HTML, XML, C, C++, object-oriented C, JavaScript®, Java®, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the system 400, may be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be apparent.

As discussed above, embodiments of the present disclosure include techniques for generating a photographic transformation of an original self-portrait image into a neutral-pose image. According to an embodiment, a photographic transformation or conversion causes the self-portrait to appear well-composed, showing a neutral body pose with relaxed arms and greater visibility of the background than in the original self-portrait where the subject's arm(s) are outstretched toward the camera. In effect, the transformation or conversion repositions any raised, extended, or otherwise outstretched arms appearing in the self-portrait, such as shown in FIGS. 1A and 2A, downward to a relaxed neutral position and fills in any background regions exposed by the repositioning of the arm(s). The result of the transformation or conversion, such as shown in FIGS. 1B and 2B, is referred to as a neutral-pose portrait or neutral-pose image.

Referring again to FIG. 3 in more detail, an example process 300 for converting a self-portrait input image/in 302 into a neutral-pose result image/out 308a is shown. The process 300 can be implemented, for example, in the self-portrait conversion application 414 of FIG. 4. To achieve high quality results, the process 300 includes several modules, or stages, indicated at 304, 306 and 308, as explained above. Generally, the modules 304, 306 and 308 are configured to search for a nearest neutral pose in a dataset, perform coordinate-based inpainting of the body texture, refine the result, and composite it on the background, respectively. In more detail, the nearest pose search module 304 is used to find a target neutral pose $P_{tgt}$ 304a that closely matches the pose in the upper torso region of the subject in the self-portrait input image 302 using a non-parametric search. The coordinate-based inpainting module 306 maps the pixels in the self-portrait input image 302 to the corresponding regions of the target neutral pose 304a to synthesize a coarse result image 306a. The natural-pose composition module 308 synthesizes details in the body region and fills in holes in the background of the coarse result image 306a to composite the synthesized body onto the self-portrait input image 302, thereby producing the neutral-pose result image 308a.

A dense pose estimation is used to map correspondences between a two-dimensional image and a surface-based representation of the human body at each stage of the process 300. These dense correspondences provide a dense UV coordinate map for the entire portion of the visible human body. The UV-map is a useful pose representation because it provides body shape and orientation information, which are used by the nearest pose search module 304. Color values in UV space are also relatively invariant to the person's pose, so this also enables the coordinate-based inpainting module 306 to produce sharp results.

In some embodiments, one or more separate photographs are captured in the same location(s) where self-portraits are taken. For example, a photograph of the background, without the subject of the portrait, is captured separately from the self-portrait taken at the same location. In such cases, the field of view of the photograph is extended by virtually moving the camera further away from the subject. To accomplish this, a region of the self-portrait including the subject's body is separated from its original background. The subject's body is synthesized in a neutral pose and composited onto the original or separately-captured background photograph.

The disclosed techniques provide solutions to several problems associated with transforming the self-portrait input image 302 into the neutral-pose result image 308a. First, training data for pairing a self-portrait image to a natural-pose portrait may not exist. Therefore, a model is trained to achieve the pairings (e.g., using the paired data synthesis module 416). Second, the same self-portrait pose can reasonably correspond to multiple plausible neutral poses. Therefore, techniques are provided to handle this multiplicity. Third, changing the pose of the subject creates holes in the background where the arms are repositioned from. Therefore, those holes are filled with a background image while maintaining a smooth transition between the background and the body of the subject.

According to various embodiments, a general unsupervised approach, such as CycleGAN, can be used to train the image pairing model. While unsupervised training works well on appearance transforms, such techniques may be less effective on geometry transforms, especially for the complex shape of the human body. Another approach for training the image pairing model is to use an unsupervised image generation network that has been specialized for person generation. Such specialized training techniques may result in noticeable artifacts on the generated person images and loss of texture details resulting from compression of appearance information.

According to an embodiment of the present disclosure, pairs of self-portrait images and neutral-pose image are synthesized by the pose search module 708 after pose alignment 704. Then, these paired data are used to train the coordinate-based inpainting module 306 and composition module 308 using self-supervised learning techniques. This self-supervised learning can be implemented, for example, in the paired data training application 412 of FIG. 4. A non-parametric nearest pose search process (e.g., as described with respect to the nearest pose search module 304) is used to retrieve the nearest self-portrait pose for a given neutral-pose image from a dataset of existing portrait images. A self-portrait image is then synthesized from the nearest self-portrait pose (obtained from the dataset) and paired with the corresponding neutral-pose image. The synthesized paired data is used to train a supervised person image generation network. Some noticeable artifacts may exist in the results, especially for the cases where the body or background are extended, because the synthetic paired data may contain holes or otherwise be incomplete. A coordinate-based inpainting method is then applied to inpaint the body texture in UV coordinate space. This space is mostly invariant to the original body pose and is therefore more robust to imperfections in the synthesized data. Additionally, the coordinate-based inpainting method can reuse visible pixels to provide higher resolution results.

According to an embodiment of the present disclosure, holes in the image created by repositioning of the subject's arms are filled to create a smooth transition between the background and the body. To address this, a gated convolutional layer-based composition network is used to jointly refine the body appearance, fill the background holes, and maintain smooth transitions between the human body and background. This design is flexible for both the ordinary and extended scenarios and does not need an extra background inpainting network.

Image Generation, Translation and Completion

Generative models, such as generative adversarial networks (GAN), adversarial autoencoders (AAE), variational autoencoders (VAE), and auto-regressive generative models (ARM) can generate realistic-looking images from noise. To allow more control during the generation process, conditional image generation techniques employ class label, attributes, text, key-points, and images as conditioning signals. Image-to-image translation networks are conditioned on images, such as semantic segmentation maps, edge maps and RGB images. To alleviate the need of collecting paired data, unsupervised methods based on the ideas of cycle-consistency and shared latent space can be used. Unsupervised approaches can be extended to solve multimodal image-to-image translation problems by disentangling content and style representations. These techniques perform appearance manipulation without modifying the underlying geometry in the image.

Image completion techniques are used to fill in missing regions of an image. Applications of image completion include image inpainting and image out-painting. Some patch-based texture synthesis approaches work well for images containing simple and repetitive structures but may fail to handle images of complex scenes. To address this problem, certain other texture synthesis approaches apply deep learning for image completion with the ability to gain semantic understanding of the image content. An example deep learning technique for image inpainting is a context encoder, which uses an encoder-decoder architecture. To achieve improved results, patch-match techniques can be employed at the feature level. A gated convolutional layer, which learns a dynamic feature gating mechanism for each channel and each spatial location, can also be employed in both the coordinate-based inpainting network and the composition network to fill in holes in the UV map and the background.

Collecting Unpaired Self-Portrait and Neutral-Pose Portrait Images

In accordance with an embodiment of the present disclosure, self-portrait photographs are synthesized from neutral-pose portrait photographs. For example, a dataset of 22,669 photos of people in neutral poses is collected from one or more public databases or other image sources. Other size datasets can be used. Dense pose information is then extracted from all the images in the dataset. The extracted dense pose representations form a neutral pose portrait dataset $\{P_{nuetral}^i\}$. Next, a dataset of, for example, 4,614 self-portrait photographs is collected from Internet sources. It will be understood that other size datasets can be used. The self-portrait photographs can be located by searching for certain keywords, such as "selfie girl," "selfie boy," or using any other suitable search terms. Images that have disconnected body parts or have any of the frontal upper body parts missing are excluded. This strategy can also be used to curate the neutral-pose portrait dataset. A 4114/500 image split is used for training and testing. The dense pose representation of self-portrait photographs forms a dataset $\{P_{selfie}^i\}$.

Synthesizing Paired Training Data

Figure 5:
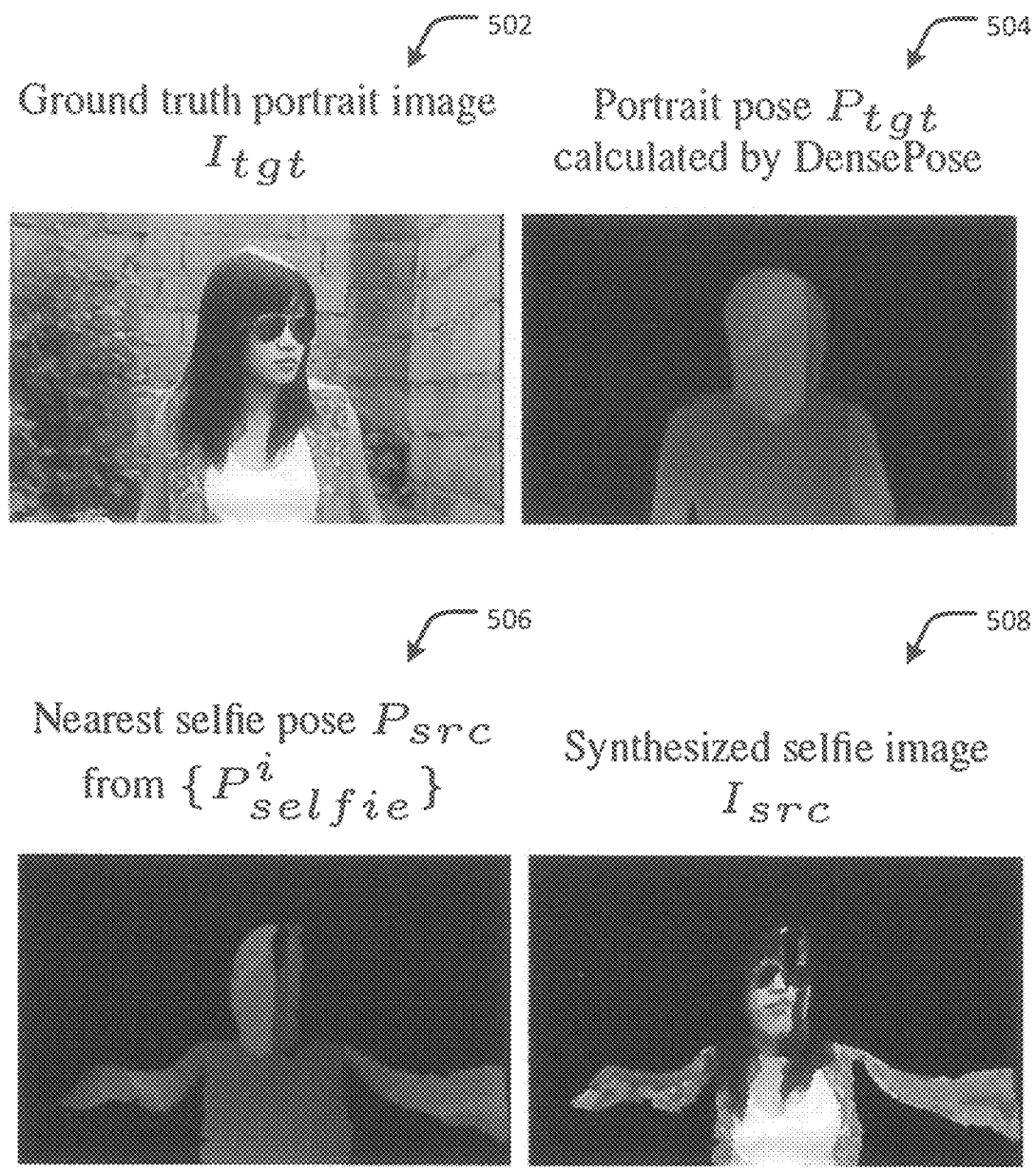
FIG. 5 shows an example of a ground truth input neutral pose image, a calculated neutral pose image, a nearest pose image, and a synthesized neutral-pose result image, in accordance with an embodiment of the present disclosure.

FIG. 5 shows an example a ground truth input neutral pose image, a calculated neutral pose image, a nearest pose image, and a synthesized neutral-pose result image, in accordance with an embodiment of the present disclosure. Based on the collected portrait photos, corresponding self-portrait photographs are synthesized using dense pose estimation. As shown in FIG. 5, given a ground truth input neutral pose $I_{tgt}$ 502, a neutral pose $P_{tgt}$ 504 can be extracted using dense pose estimation. The self-portrait photograph dataset $\{P_{selfie}^i\}$ is searched to locate a self-portrait pose $P_{src}$ 506 that most closely matches the upper torso region in the neutral pose 504. Through dense pose correspondences, pixels in the original self-portrait image are mapped to the nearest self-portrait pose, such as described below. Due to the pose change and self-occlusion, the synthesized image may contain holes caused by the dense pose correspondence or by pixels visible in the synthesized image but not visible in the original self-portrait, such as the armpits or the backside of arms. These paired images can be used to train supervised human synthesis models.

Figure 6:
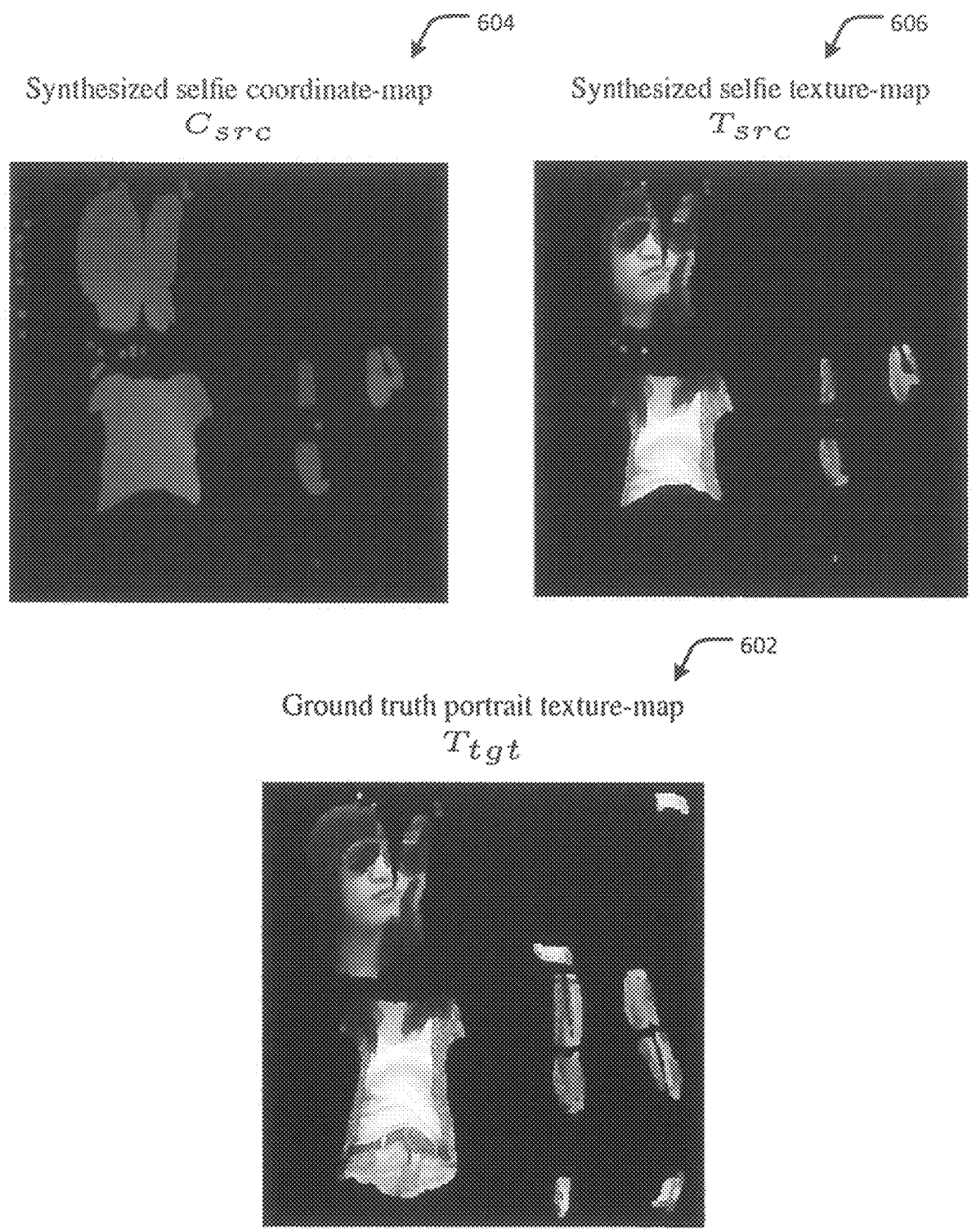
FIG. 6 shows an example ground truth portrait texture map, a synthesized self-portrait coordinate map, and a self-portrait texture map, in accordance with an embodiment of the present disclosure.

FIG. 6 shows an example ground truth portrait texture map, a synthesized self-portrait coordinate map, and a self-portrait texture map, in accordance with an embodiment of the present disclosure. Instead of using the synthetic paired images to synthesize pixels directly, the paired images are converted into a dense pose UV coordinate space. Inpainting is performed in the UV coordinate space. As shown in FIG. 6, from the ground truth portrait texture map $T_{tgt}$ 602, a synthesized self-portrait coordinate map $C_{src}$ 604 is obtained via neutral-to-self-portrait pose search and a dense pose mapping. Then from $C_{src}$ 604, pixels are sampled from the ground truth portrait texture map $T_{tgt}$ 602 to synthesize the self-portrait texture map $T_{src}$ 606. $T_{src}$ 606 and $C_{src}$ 604 are used as inputs to train the inpainting model, such as described below. In some embodiments, $C_{src}$ 604 includes three channels of information, and $T_{src}$ 606 includes three channels of information.

Nearest Pose Search

A target neutral pose is selected for converting a self-portrait photograph into a neutral-pose photograph. A non-parametric nearest pose search is used to find the neutral poses in the $\{P_{neutral}^i\}$ dataset that most closely match the pose of the upper torso region of the subject in the self-portrait input image. An unsupervised learning approach can also be used to perform pose translation. However, the non-parametric approach has several advantages: (1) the retrieved target poses are guaranteed to be natural since they come from real photos; (2) multiple neutral-pose results can be generated by choosing the top-K most similar poses as the target poses; and (3) the retrieved poses are similar to the input pose, which makes pose correction easier since fewer pixels need to be modified.

At inference time, the search is performed for a given input self-portrait photograph for the k-nearest target neutral poses. At training time, the pose search direction is reversed and searched for a given target neutral pose to find a matching self-portrait photograph. This allows synthetization of synthetic data, which are used to self-supervise the inpainting and composition networks. The procedure is otherwise the same at both training and inference time.

Figure 7:
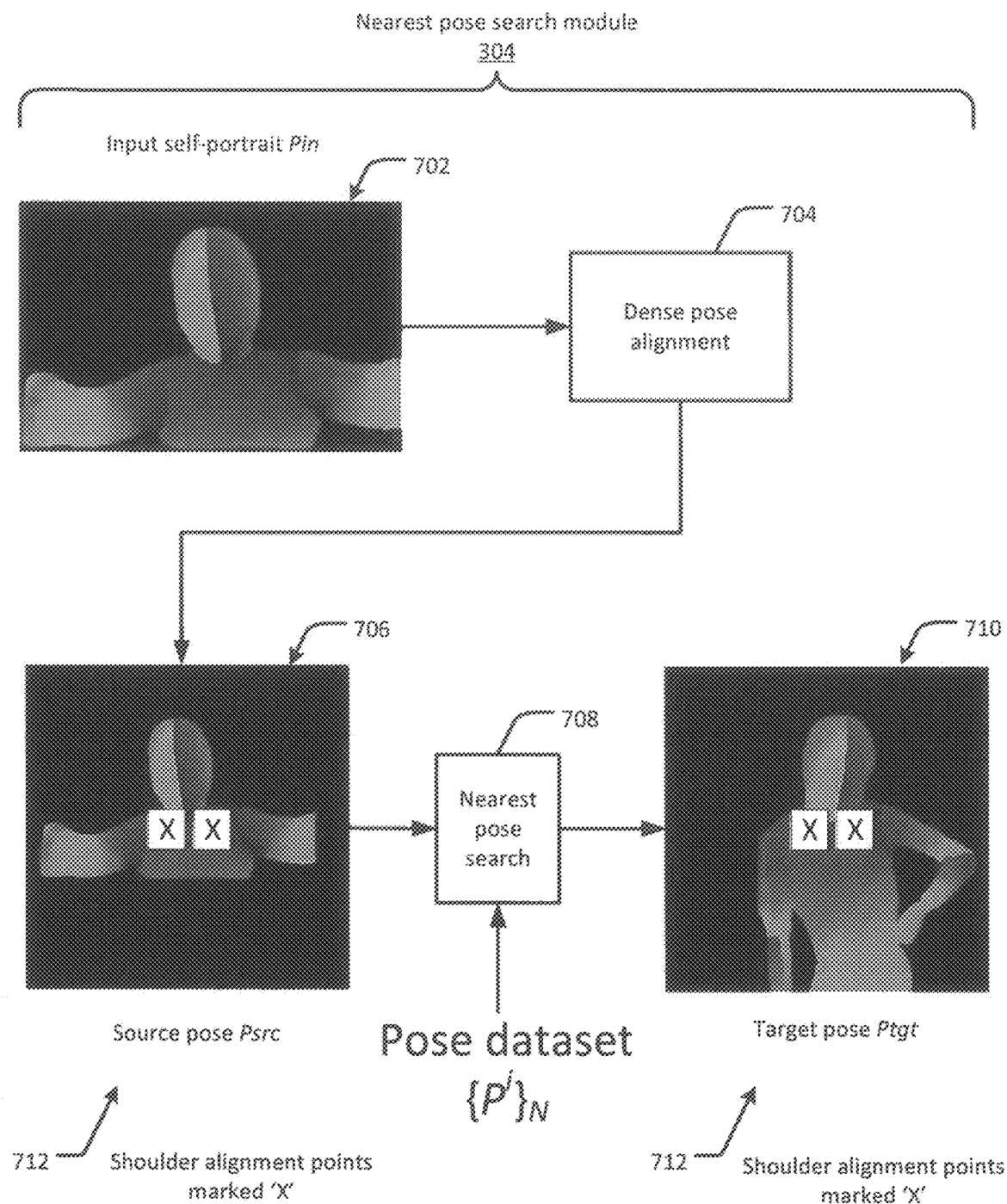
FIG. 7 shows an example input self-portrait pose image, a source pose image, and a target pose image, in accordance with an embodiment of the present disclosure.

FIG. 7 shows an example input self-portrait pose image, a source pose image, and a target pose image, in accordance with an embodiment of the present disclosure. The input self-portrait pose Pin 702 is aligned 704 by putting two selected shoulder points 712 near the center of the image to obtain the source pose $P_{src}$ 706. All neutral target poses 710 are also aligned in the same way. Note that other points in the image can be used for alignment, such as the center of the torso or the armpit region. For example, the image and pose can be aligned into the center part of a 256×256 resolution canvas. Likewise, the coordinate-map and texture-map are also in 256×256 resolution. To align the image and pose, two shoulder points whose locations are at (63, 133) and (92,133) on the 256×256 coordinate-map are used. After obtaining the coordinates of the two shoulder points from the coordinate-map, the scale and translation factors for image and pose alignment are calculated by aligning the shoulder points to (112,128) and (143,128) on the 256×256 image.

The pose similarity 708 is calculated in the frontal torso region excluding the head, since the later stages of the process 300 keep the head region intact and only correct the body pose. The dense pose representation P 710 is an IUV map which contains three channels. The $P^I$ channel contains indices of body parts to which pixels belong, and the P channels contain the UV coordinates.

Based on $P^I$ and $P^{UV}$, a two-step search strategy is used to calculate pose similarity. First, a search for suitable target poses is performed based on global information in the target pose images, such as body shape and position. To determine the global similarity between two poses, the following equation is used:

$$d^I(P_1, P_2) = \sum_{x \in R_1 \cup R_2} \mathbb{1}(P_1^I(x) \neq P_2^I(x)), \quad (1)$$

where R refers to the front torso regions of the body. The equation iterates over all pixels in both torso regions and counts the number of pixels that belong to different body parts in the two poses. If there is large body part index mismatch in the torso regions, the two poses are dissimilar at a global level.

Among the top-K pose candidates selected based on $d^I$, the ranking is improved by leveraging local pose information given by the UV coordinates to obtain a target pose $P_{tgt}$ 706. In particular, for pixels belonging to torso regions in both poses, the sum of the distances of their local UV coordinates is calculated as follows:

$$d^{UV}(P_1, P_2) = \sum_{x \in R_1 \cap R_2} \|P_1^{UV}(x) - P_2^{UV}(x)\|_2. \quad (2)$$

Coordinate Inpainting

To infill the target neutral pose $P_{tgt}$ 706, visible body pixels in the source image are used to fill in the invisible body parts of the target image by taking advantage of human body symmetry.

Figure 8:
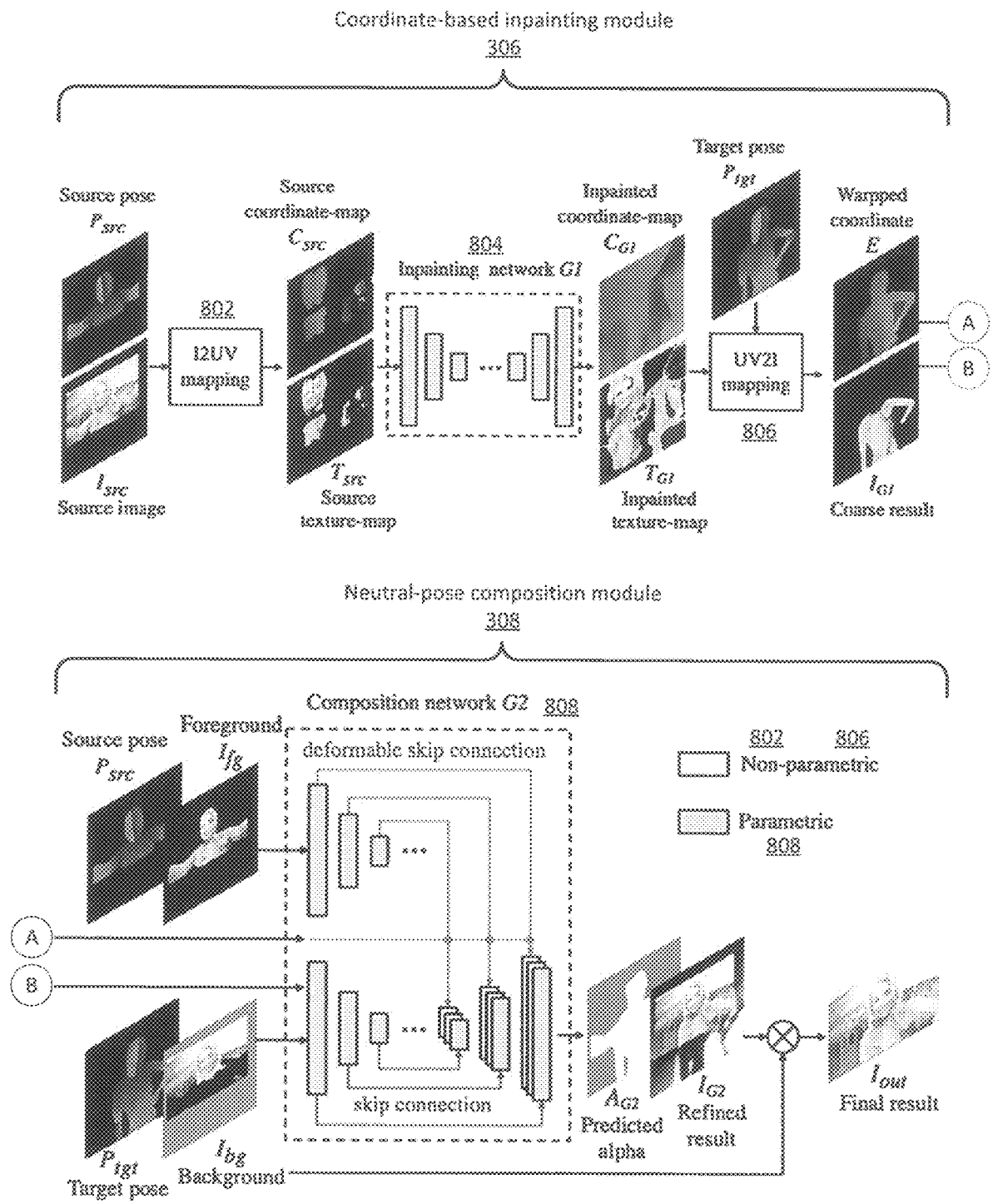
FIG. 8 shows an example coordinate-based inpainting process and an example neutral-pose composition process, in accordance with an embodiment of the present disclosure.

FIG. 8 shows an example coordinate-based inpainting process and an example neutral-pose composition process, in accordance with an embodiment of the present disclosure. Within the coordinate-based inpainting module 306 of FIG. 3, an Image-to-UV (I2UV) mapping 802 is used to translate the source pose $P_{src}$ and the color source image $I_{src}$, from the image domain to the UV domain. Defined in the UV domain, a source coordinate-map $C_{src}$ stores the associated {x, y} coordinates of pixels in the original source image space. Likewise in the UV domain, a source texture map $T_{src}$ contains the RGB colors of the associated pixels in the original source image $I_{src}$: these are looked up by using bilinear sampling via $T_{src} = I_{src}(C_{src})$.

After the I2UV mapping 802, an inpainting neural network $G_1$ 804 is used to inpaint the coordinate-map $C_{src}$. $C_{src}$ and $T_{src}$ are concatenated as an input to the network 804. The network 804 outputs the inpainted coordinate-map $C_{G_1} = G_1(C_{src}, T_{src})$. A bilinear sampling is performed to obtain the inpainted texture-map $T_{G_1} = I_{src}(C_{G_1})$.

Next, $C_{G_1}$ and $T_{G_1}$ are mapped back to the image space with an UV-to-Image (UV2I) mapping 806 using the bilinear sampling operations $E = C_{G_1}(P_{tgt})$, $I_{G_1} = T_{G_1}(P_{tgt})$.

To train the inpainting network $G_1$ 804, three loss functions, identity loss $L_{idt}^{G_1}$, $L_1$ loss $L_1^{G_1}$ and perceptual loss $L_P^{G_1}$, are used as follows:

$$L_{idt}^{G_1} = \mathbb{E}[\|C_{G_1} - C_{src}\|_2^2 V_{src}], \quad (3)$$

$$L_1^{G_1} = \mathbb{E}[\|T_{G_1} - T_{tgt}\|_1], \quad (4)$$

$$L_P^{G_1} = \mathbb{E}[\|\phi(T_{G_1}) - \phi(T_{tgt})\|_2^2], \quad (5)$$

$V_{src}$ is a binary mask that selects the non-empty regions in the coordinate map $C_{src}$. $T_{tgt}$ is the ground truth texture mapped from the image domain to the UV domain (see FIG. 6); that is, $T_{tgt} = I2UV(I_{tgt})$. The identity loss encourages the existing coordinates to stay unchanged while the inpainting network $G_1$ 804 synthesizes coordinates elsewhere. The $L_1$ loss and perceptual loss are performed in the pixel space instead of the coordinate space and use the ground truth image for supervision.

The overall loss for the inpainting network $G_1$ 804 is:

$$\min_{G_1} L^{G_1} = L_1^{G_1} + \lambda_1 L_P^{G_1} + \lambda_2 L_{idt}^{G_1}, \quad (6)$$

Neutral-Pose Composition

Still referring to FIG. 8, an advantage of inpainting in the coordinate space is that the inpainting network $G_1$ 804 can copy and paste original pixels to fill in missing regions based on body symmetry, which causes the synthesized (inpainted) pixels tend to appear sharp. However, in some cases, a small number of visible pixels get copied into a much larger region resulting in a flat and unrealistic appearance due to texture repetitions and distortions. In addition, when the subject's arms are moved down into a neutral pose, holes will appear in the background due to disocclusion.

To address these problems, in accordance with an embodiment, a composition network $G_2$ 808 is used by the neutral-pose composition module 308 of FIG. 3 to add details to the human body and fill in the gaps between the human body and the background. A U-Net architecture with gated convolutional layers is used in the composition network $G_2$ 808. U-Net is a fully convolutional encoder-decoder neural network, such as described by Grigorev et al., "Coordinate-based Texture Inpainting for Pose-Guided Image Generation," Conference on Computer Vision and Pattern Recognition (CVPR) 2019, and by Siarohin et al., "Deformable gans for pose-based human image generation," CVPR, 2018. In U-net, a contracting network is supplanted by successive layers, where pooling operations are replaced by upsampling operators. These layers increase the resolution of the output. A successive convolutional layer can then learn to assemble a precise output based on this information. One modification in U-Net is that there are a large number of feature channels in the upsampling part, which allow the network to propagate context information to higher resolution layers. As a consequence, the expansive path is more or less symmetric to the contracting part, which yields a u-shaped architecture. The network uses the valid part of each convolution without any fully connected layers. To predict the pixels in the border region of the image, the missing context is extrapolated by mirroring the input image. This tiling strategy is important to apply the network to large images, since otherwise the resolution would be limited by the GPU memory. The U-net architecture helps preserve the high-resolution features through skip-connections. The gated convolutional layer improves the inpainting result quality when dealing with holes of arbitrary shape. To keep the body appearance consistent, deformable skip connections are used to propagate the appearance information from the source image $I_{src}$, to the result image $I_{out}$ regardless of any large changes in the pose. The composition network $G_2$ 808 synthesizes missing foreground pixels, fills in background holes (missing portions), and produces an alpha mask $A_{G_2}$. $A_{G_2}$ is used to blend the synthesized pixels $I_{G_2}$ into the background image $I_{bg}$, i.e., $I_{out} = I_{G_2} A_{G_2} + I_{bg}(1 - A_{G_2})$. The original head and neck regions are added into the background image $I_{bg}$ so that after blending the head regions will remain untouched.

To train the composition network $G_2$ 808, $L_1$ loss $L_1^{G_2}$, perceptual loss $L_P^{G_2}$ [58], alpha loss $L_A^{G_2}$ and adversarial loss $L_{adv}^{G_2,D}$, are applied as follows:

$$L_1^{G_2} = \mathbb{E}[\|I_{out} - I_{tgt}\|_1 (1+H)], \quad (7)$$

$$L_P^{G_2} = \mathbb{E}[(\|\phi(I_{out}) - \phi(I_{tgt})\|_2^2 (1+H)], \quad (8)$$

$$L_A^{G_2} = \mathbb{E}[\|A_{G_2}) - H\|_1], \quad (9)$$

$$\min_{G_2}\max_{D} L_{adv}^{G_2,D} = \mathbb{E}[(D(I_{tgt}))^2(1+H)] + \mathbb{E}[(D(I_{out})-1)^2(1+H)], \quad (10)$$

where $I_{tgt}$ denotes the ground truth neutral-pose portrait. H is a binary mask indicating the location of holes in $I_{bg}$ and is estimated using a deep image matting technique and binarized with threshold 0:1. The overall loss for $G_2$ is $$\min_{G_2}\max_{D} L^{G_2} = L_1^{G_2} + \lambda_3 L_P^{G_2} + \lambda_4 L_A^{G_2} + \lambda_5 L_{adv}^{G_2,D}, \quad (11)$$

There are domain gaps between the training and testing scenarios. During training, a self-portrait photograph is synthesized from a ground truth neutral-pose portrait, and therefore the head and the body regions from the inpainting step are seamlessly aligned since they come from the same photo. However, during testing, the head region of the self-portrait is kept, but the body region is modified using a neutral pose retrieved by the nearest pose search module 304. The nearest pose search module 304 may, in some instances, introduce small misalignments between the body and the head due to the limited size of the self-portrait and neutral-pose datasets.

To narrow this gap, during training, synthetic holes are added to the background and white noise is added to the neck region. To simulate holes in the input self-portrait image, a binary mask $H = H_{selfie} \cup H_{selfie}$ is calculated, which is also used in Eq. 9 to 10. $H_{selfie}$ and $H_{neutral}$ denotes the body region in the selfie and the neutral-pose portrait. These are estimated and binarized with threshold 0.1. To add white noise, 80% of neck pixels are randomly set to white in $I_{bg}$ before feeding that image into the composition network $G_2$ 808. Before blending, the entire neck region in the synthesized alpha mask $A_{G_2}$ is set to 1 to avoid directly copying the neck pixels from $I_{bg}$ into $I_{out}$ due to potential incompatibility between the original neck and the synthesized body.

The performance of the composition network $G_2$ 808 can be improved by masking out the generated pixels in an invalid region M, which denotes the invalid region of the image caused by the alignment. Therefore, the final output can be formulated as follows:

$$I_{out} = (I_{G_2} A_{G_2} + I_{bg}(1-A_{G_2}))(1-M)$$

Example Self-Portrait Conversion Methodology

Figure 9:
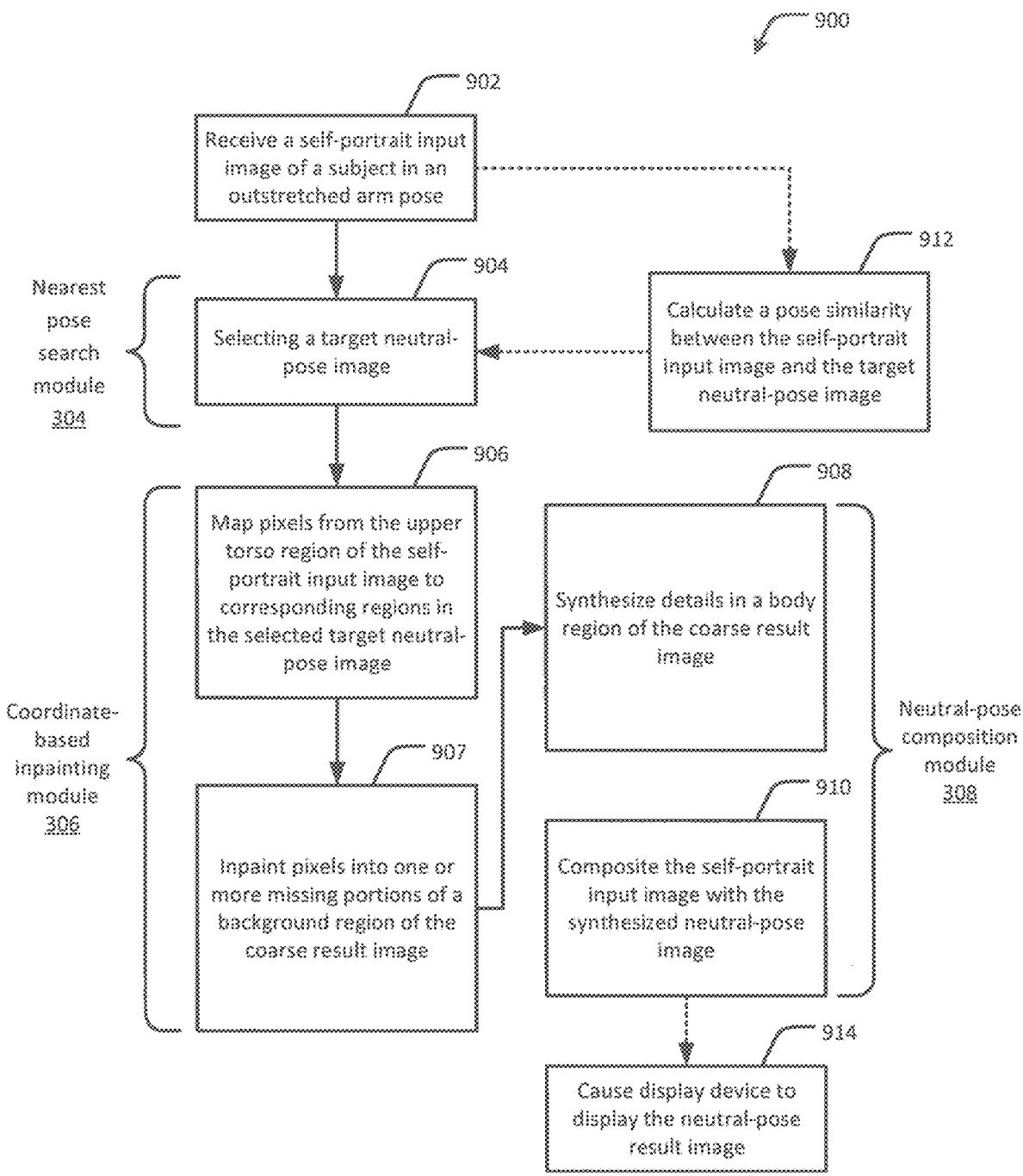
FIG. 9 illustrates an example method for converting a self-portrait image into a neutral-pose portrait image, in accordance with an embodiment of the present disclosure.

FIG. 9 shows a flow diagram of an example process 900 for converting a self-portrait image into a neutral-pose portrait image, according to an embodiment of the present disclosure. The process 900 can be implemented, for example, in the system 400 of FIG. 4. The process 900 includes receiving 902 a self-portrait input image of a subject in an outstretched arm pose. The method 900 further includes selecting 904, from a dataset of neutral-pose images of subjects in non-outstretched arm poses, a target neutral-pose image that approximates a pose of an upper torso region of the subject in the self-portrait input image.

The selected target neutral-pose image will be used to convert the self-portrait input image of subject with outstretched arm(s) into an image where the subject is in a neutral pose with non-outstretched arms. In general, the upper torso region of the subject in the self-portrait input image selected is copied to the target neutral-pose image, while other features, such as the subject's arms and background, are synthesized and/or inpainted into the target-neutral-pose image.

The method 900 further includes mapping 906 pixels from the upper torso region of the self-portrait input image to corresponding regions in the selected target neutral-pose image and inpainting 907 pixels into one or more missing portions of a background region of the coarse result image to produce a coarse result image of the subject. The coarse result image includes, for example, a portion of the self-portrait input image corresponding to the upper torso region of the subject but excludes some other portions of the self-portrait input image, such as the subject's arms. The method 900 further includes synthesizing 908 certain details in a body region of the coarse result image, such as the subject's arms to produce a synthesized neutral-pose image. The method 900 further includes compositing the self-portrait input image with the synthesized neutral-pose image to produce a neutral-pose result image of the subject in the non-outstretched arm pose.

In some embodiments, the method 900 includes calculating 912 a pose similarity between the self-portrait input image and the target neutral-pose image using a dense pose representation of the self-portrait input image. The target neutral-pose image is selected 904 based on the calculated pose similarity. In some embodiments, the calculating of the pose similarity further comprises aligning at least one point on the upper torso region of the subject in the self-portrait input image with at least one point on the upper torso region of the subject in the target neutral-pose image, such as described with respect to FIG. 7. In this way, by aligning points on the upper torso region of the subject's body between the input and target images, the pose similarity between the images can be obtained more accurately. To further improve accuracy, in some embodiments, the calculating of the pose similarity is based at least in part on global information in the target-neutral pose image and local information in the target-neutral pose image. The global information includes indices of body parts (e.g., shoulders, torso, head, etc.) to which pixels belong in the target-neutral pose image, and the local information includes UV coordinates of pixels in the target-neutral pose image.

In some embodiments, the inpainting of pixels into one or more missing portions of a background region of the coarse result image includes using an inpainting neural network to inpaint a map of pixel coordinates in the self-portrait input image, such as described with respect to the inpainting network $G_1$ 804 of FIG. 8. In some embodiments, the compositing of the self-portrait input image includes using a compositional network having a U-net architecture with gated convolutional layers to synthesize foreground pixels in the synthesized neutral-pose image and fill in the one or more missing portions of the synthesized neutral-pose image, such as described above with respect to the composition network $G_2$ 808 of FIG. 8.

In some embodiments, the method 900 includes causing 914 a display device to display the neutral-pose result image of the subject in the non-outstretched arm pose.

Additional Examples

Numerous embodiments will be apparent in light of the present disclosure, and features described herein can be combined in any number of configurations. One example embodiment provides a computer-implemented method for converting a self-portrait image into a neutral-pose portrait image. The method includes receiving a self-portrait input image of a subject in an outstretched arm pose. The outstretched arm pose includes one or two outstretched arms in the self-portrait input image. The method further includes selecting, from a dataset of neutral-pose images of subjects in non-outstretched arm poses, a target neutral-pose image that approximates a pose of an upper torso region of the subject in the self-portrait input image. The method further includes mapping pixels from the upper torso region of the self-portrait input image to corresponding regions in the selected target neutral-pose image and inpainting pixels into one or more missing portions of a background region of the self-portrait input image to produce a coarse result image of the subject. The method further includes synthesizing details in a body region of the coarse result image to produce a synthesized neutral-pose image and compositing the self-portrait input image with the synthesized neutral-pose image to produce a neutral-pose result image of the subject in the non-outstretched arm pose. In some cases, the method includes calculating a pose similarity between the self-portrait input image and the target neutral-pose image using a dense pose representation of the self-portrait input image, where the target neutral-pose image is selected based on the calculated pose similarity. In some such cases, the calculating of the pose similarity further includes aligning at least one point on the upper torso region of the subject in the self-portrait input image with at least one point on the upper torso region of the subject in the target neutral-pose image. In some other such cases, the calculating of the pose similarity is based at least in part on global information in the target-neutral pose image and local information in the target-neutral pose image, wherein the global information includes indices of body parts to which pixels belong in the target-neutral pose image, and wherein the local information includes UV coordinates of pixels in the target-neutral pose image. In some cases, the inpainting of pixels into one or more missing portions of a background region of the coarse result image includes using an inpainting neural network to inpaint a map of pixel coordinates in the self-portrait input image. In some cases, the compositing of the self-portrait input image includes using a compositional network having a U-net architecture with gated convolutional layers to synthesize foreground pixels in the synthesized neutral-pose image and fill in the one or more missing portions of the synthesized neutral-pose image. In some cases, the method includes causing a display device to display the neutral-pose result image of the subject in the non-outstretched arm pose. Another example embodiment provides a computer program product including one or more non-transitory machine-readable mediums having instructions encoded thereon that when executed by at least one processor cause a process for converting a self-portrait image into a neutral-pose portrait image as described in this paragraph to be carried out.

Another example embodiment provides a system for converting a self-portrait image into a neutral-pose portrait image. The system include a storage and at least one processor operatively coupled to the storage, the at least one processor configured to execute instructions stored in the storage that when executed cause the processor to carry out a process. The process includes including receiving a self-portrait input image of a subject in an outstretched arm pose. The outstretched arm pose includes one or two outstretched arms. The process further includes selecting, from a dataset of neutral-pose images of subjects in non-outstretched arm poses, a target neutral-pose image that approximates a pose of an upper torso region of the subject in the self-portrait input image. The process further includes mapping pixels from the upper torso region of the self-portrait input image to corresponding regions in the selected target neutral-pose image and inpainting pixels into one or more missing portions of a background region of the self-portrait input image to produce a coarse result image of the subject. The process further includes synthesizing details in a body region of the coarse result image to produce a synthesized neutral-pose image and compositing the self-portrait input image with the synthesized neutral-pose image to produce a neutral-pose result image of the subject in the non-outstretched arm pose. In some cases, the process includes calculating a pose similarity between the self-portrait input image and the target neutral-pose image using a dense pose representation of the self-portrait input image, where the target neutral-pose image is selected based on the calculated pose similarity. In some cases, the calculating of the pose similarity further comprises aligning at least one point on the upper torso region of the subject in the self-portrait input image with at least one point on the upper torso region of the subject in the target neutral-pose image. In some cases, the calculating of the pose similarity is based at least in part on global information in the target-neutral pose image and local information in the target-neutral pose image, where the global information includes indices of body parts to which pixels belong in the target-neutral pose image, and where the local information includes UV coordinates of pixels in the target-neutral pose image. In some cases, the inpainting of pixels into one or more missing portions of a background region of the coarse result image includes using an inpainting neural network to inpaint a map of pixel coordinates in the self-portrait input image. In some cases, the compositing of the self-portrait input image includes using a compositional network having a U-net architecture with gated convolutional layers to synthesize foreground pixels in the synthesized neutral-pose image and fill in the one or more missing portions of the synthesized neutral-pose image. In some cases, the system includes a display device configured to display the neutral-pose result image of the subject in the non-outstretched arm pose.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method for converting a self-portrait image into a neutral-pose portrait image, the method comprising:
    receiving a self-portrait input image of a subject in an outstretched arm pose, the outstretched arm pose including one or two outstretched arms;
    selecting, from a dataset of neutral-pose images of subjects in non-outstretched arm poses, a target neutral-pose image that approximates a pose of an upper torso region of the subject in the self-portrait input image;
    mapping a first set of pixels from the upper torso region of the self-portrait input image to corresponding regions in the target neutral-pose image and inpainting a second set of pixels into one or more missing portions of a background region of the self-portrait input image to produce a coarse result image of the subject;

synthesizing details in a body region of the coarse result image to produce a synthesized neutral-pose image; and compositing the self-portrait input image with the synthesized neutral-pose image to produce a neutral-pose result image of the subject in a non-outstretched arm pose.

2. The method of claim 1, further comprising calculating a pose similarity between the self-portrait input image and the target neutral-pose image using a dense pose representation of the self-portrait input image, wherein the target neutral-pose image is selected based on the pose similarity.

3. The method of claim 2, wherein the calculating of the pose similarity further comprises aligning at least one point on the upper torso region of the subject in the self-portrait input image with at least one point on the upper torso region of the subject in the target neutral-pose image.

4. The method of claim 2, wherein the calculating of the pose similarity is based at least in part on global information in the target neutral-pose image and local information in the target neutral-pose image, wherein the global information includes indices of body parts to which corresponding pixels belong in the target neutral-pose image, and wherein the local information includes UV coordinates of associated pixels in the target neutral-pose image.

5. The method of claim 1, wherein the inpainting of the second set of pixels into the one or more missing portions of the background region includes using an inpainting neural network to inpaint a map of pixel coordinates in the self-portrait input image.

6. The method of claim 1, wherein the compositing of the self-portrait input image includes using a compositional network having a U-net architecture with gated convolutional layers to synthesize foreground pixels in the synthesized neutral-pose image and fill in the one or more missing portions of the synthesized neutral-pose image.

7. The method of claim 1, further comprising causing a display device to display the neutral-pose result image of the subject in the non-outstretched arm pose.

8. A computer program product including one or more non-transitory machine-readable mediums having instructions encoded thereon that when executed by at least one processor cause a process to be carried out for converting a self-portrait image into a neutral-pose portrait image, the process comprising:

receiving a self-portrait input image of a subject in an outstretched arm pose, the outstretched arm pose including one or two outstretched arms;

selecting, from a dataset of neutral-pose images of subjects in non-outstretched arm poses, a target neutral-pose image that approximates a pose of an upper torso region of the subject in the self-portrait input image;

mapping a first set of pixels from the upper torso region of the self-portrait input image to corresponding regions in the target neutral-pose image and inpainting a second set of pixels into one or more missing portions of a background region of the self-portrait input image to produce a coarse result image of the subject;

synthesizing details in a body region of the coarse result image to produce a synthesized neutral-pose image; and compositing the self-portrait input image with the synthesized neutral-pose image to produce a neutral-pose result image of the subject in a non-outstretched arm pose.

9. The computer program product of claim 8, wherein the process further comprises calculating a pose similarity between the self-portrait input image and the target neutral-pose image using a dense pose representation of the self-portrait input image, wherein the target neutral-pose image is selected based on the pose similarity.

10. The computer program product of claim 9, wherein the calculating of the pose similarity further comprises aligning at least one point on the upper torso region of the subject in the self-portrait input image with at least one point on the upper torso region of the subject in the target neutral-pose image.

11. The computer program product of claim 9, wherein the calculating of the pose similarity is based at least in part on global information in the target neutral-pose image and local information in the target neutral-pose image, wherein the global information includes indices of body parts to which corresponding pixels belong in the target neutral-pose image, and wherein the local information includes UV coordinates of associated pixels in the target neutral-pose image.

12. The computer program product of claim 8, wherein the inpainting of the second set of pixels into the one or more missing portions of the background region includes using an inpainting neural network to inpaint a map of pixel coordinates in the self-portrait input image.

13. The computer program product of claim 8, wherein the compositing of the self-portrait input image includes using a compositional network having a U-net architecture with gated convolutional layers to synthesize foreground pixels in the synthesized neutral-pose image and fill in one or more missing portions of the synthesized neutral-pose image.

14. A system for converting a self-portrait image into a neutral-pose portrait image, the system comprising:

a storage; and at least one processor operatively coupled to the storage, the at least one processor configured to execute instructions stored in the storage that when executed cause the processor to carry out a process including receiving a self-portrait input image of a subject in an outstretched arm pose, the outstretched arm pose including one or two outstretched arms;

selecting, from a dataset of neutral-pose images of subjects in non-outstretched arm poses, a target neutral-pose image that approximates a pose of an upper torso region of the subject in the self-portrait input image;

mapping a first set of pixels from the upper torso region of the self-portrait input image to corresponding regions in the target neutral-pose image and inpainting a second set of pixels into one or more missing portions of a background region of the self-portrait input image to produce a coarse result image of the subject;

synthesizing details in a body region of the coarse result image to produce a synthesized neutral-pose image; and compositing the self-portrait input image with the synthesized neutral-pose image to produce a neutral-pose result image of the subject in a non-outstretched arm pose.

15. The system of claim 14, wherein the process further comprises calculating a pose similarity between the self-portrait input image and the target neutral-pose image using a dense pose representation of the self-portrait input image, wherein the target neutral-pose image is selected based on the pose similarity.

16. The system of claim 15, wherein the calculating of the pose similarity further comprises aligning at least one point on the upper torso region of the subject in the self-portrait input image with at least one point on the upper torso region of the subject in the target neutral-pose image.

17. The system of claim 15, wherein the calculating of the pose similarity is based at least in part on global information in the target neutral-pose image and local information in the target neutral-pose image, wherein the global information includes indices of body parts to which corresponding pixels belong in the target neutral-pose image, and wherein the local information includes UV coordinates of associated pixels in the target neutral-pose image.

18. The system of claim 14, wherein the inpainting of the second set of pixels into the one or more missing portions of the background region includes using an inpainting neural network to inpaint a map of pixel coordinates in the self-portrait input image.

19. The system of claim 14, wherein the compositing of the self-portrait input image includes using a compositional network having a U-net architecture with gated convolutional layers to synthesize foreground pixels in the synthesized neutral-pose image and fill in one or more missing portions of the synthesized neutral-pose image.

20. The system of claim 14, further comprising a display device configured to display the neutral-pose result image of the subject in the non-outstretched arm pose.

* * * * *